United States Patent [19]

Regnier et al.

[11] Patent Number: 4,590,477
[45] Date of Patent: May 20, 1986

[54] AUTOMATIC CALIBRATION SYSTEM FOR DISTANCE MEASUREMENT RECEIVERS

[75] Inventors: John A. Regnier, Lake Ronkonkoma; Edward Savage, Dix Hills, both of N.Y.

[73] Assignee: Eaton Corporation, Cleveland, Ohio

[21] Appl. No.: 473,094

[22] Filed: Mar. 7, 1983

[51] Int. Cl.$^4$ .............................................. G01S 7/40
[52] U.S. Cl. .................................................. 343/17.7
[58] Field of Search ............... 343/17.7; 455/145, 147, 455/148, 226; 324/77 C; 315/383

[56] References Cited

U.S. PATENT DOCUMENTS

| | | | |
|---|---|---|---|
| 3,643,126 | 2/1972 | Hay | 315/383 |
| 3,803,607 | 4/1974 | Robinson | 343/17.7 |
| 4,041,387 | 8/1977 | Dalichow et al. | 324/77 C |
| 4,138,645 | 2/1979 | Parato | 343/17.7 |

Primary Examiner—Thomas H. Tarcza
Assistant Examiner—Mark Hellner
Attorney, Agent, or Firm—C. H. Grace; V. J. Ranucci

[57] ABSTRACT

A receiver time delay calibration device designed for low cost retrofitting of airborne equipment and more specifically DME equipment. In this system, the output of a VFO is applied to the RF input port of the receiver to be tested. The VFO is swept through a frequency range of the receiver until the receiver provides an output, which occurs at the operating frequency of the receiver, $f_t$. The receiver's output at $f_t$ is used to stop the sweep of the VFO and maintain it at $f_t$. The output of the VFO is then pulse modulated and the delay between the RF pulse applied to the input of the receiver and the corresponding video output pulse from the receiver is measured to determine the receiver delay time.

4 Claims, 3 Drawing Figures

AUTOMATIC CALIBRATION SYSTEM FOR DISTANCE MEASUREMENT RECEIVERS

FIELD AND BACKGROUND

This invention relates to the pulse propagation time measurement through receivers and, more particularly, to such measurements through the receivers of distance measurement equipment (DME).

There is a growing need in the aviation industry for precision landing guidance systems. Precision landing guidance is typically derived using microwave scanning antennas to provide the angular guidance in conjunction with a precision DME. An example of this is the Microwave Scanning Beam Landing System (MSBLS) built for the Space Shuttle.

There are currently in operation a number of DME systems, the most common of which is referred to as TACAN. In order for TACAN to fill the need of providing precision DME data, its accuracy would have to be increased from the typical ±150 feet to ±10 feet. A critical component needed to achieve this accuracy is an automatic calibration unit which would periodically measure range errors in the form of receiver and cable delays. This unit would have to function without modification to existing hardware and also without interfering with the normal TACAN equipment operation. The problem is further complicated by the fact that the TACAN equipment can be operating on any one of 252 different frequencies.

The airborne portion of TACAN functions by transmitting an interrogation signal to a ground based TACAN station which responds by transmitting a pulse pair coded signal to the airborne receiver portion of the TACAN equipment. The accuracy to which the airborne TACAN equipment can determine distance to the ground based TACAN station is dependent on the pulse delay through the airborne TACAN receiver on any one of the 252 frequencies it is operating on.

Current pulse delay calibration systems usually consist of laboratory type equipment such as synthesizer type frequency generators, pulse generating equipment, pulse modulation equipment and high speed oscilloscopes, none of which is suitable for airborne use by virtue of it size, weight and lack of ruggedizaton to accommodate the airborne environment.

Proposals have been made to modify existing airborne TACAN receivers to provide the pulse delay measurement function. Modification has been considered because it would be possible to determine the operating frequency of the receiver either mechanically or electrically by direct connection to the internal components of the receiver. Unfortunately, this would require removal and rework of installed and fully operational systems, a costly and unattractive solution.

SUMMARY

An object of this invention is to provide an effective, low cost system for accurately measuring the propagation delay through a receiver, such as an airborne TACAN receiver, the measurement including all delays through the receiver and associated cables.

An object of this invention is to provide pulse delay measurements without modification of the system on which the measurements are to be made and without interference with the normal operation of system to be measured.

An object of the present invention is to provide a pulse calibration system for a receiver that will automatically determine the operating frequency of the receiver without any prior knowledge of the operating frequency.

An object of the present invention is to automatically determine the operating frequency of a receiver despite a wide operating frequency range of the receiver.

An object of the present invention is to provide all of the above objects in a low cost, light weight system suitable for installation aboard aircraft now carrying distance measurement equipment (DME) such as TACAN equipment.

In the fundamental operation of the present invention, the output of a variable frequency oscillator (VFO) is supplied to the RF input of a receiver which is to be measured for pulse delay time. The VFO is swept through the frequency range of the receiver until the receiver provides an output, which occurs at the frequency to which the receiver is tuned ($f_t$). The receiver output at $f_t$ is used to stop the sweep of the VFO and hold it at the frequency $f_t$. The output of the VFO is then pulse modulated and the delay between the time the pulse is supplied to the RF port of the receiver and it emerges from the video output port is measured and used to supply the desired pulse delay time information.

The simplicity of operation of this system provides several important and unique advantages. A VFO may be used because it need only remain at $f_t$ for as long as it is necessary to to produce a single pulse. This eliminates drift problems normally associated with VFO's and thereby eliminates the need for larger, heavier and more expensive oscillators. This system determines the frequency of operation of the receiver regardless of the frequency to which it has been set and no information need be supplied to the this system to accomplish this task, making it possible for it to function automatically without interconnection with internal components of the receiver. These advantages combine to make it feasible to use this system to retrofit many existing aircraft with a light, small, low cost retrofit package that eliminates the need for either removing or reworking the existing DME receivers.

DETAILED DESCRIPTION OF THE INVENTION

Figure 1:
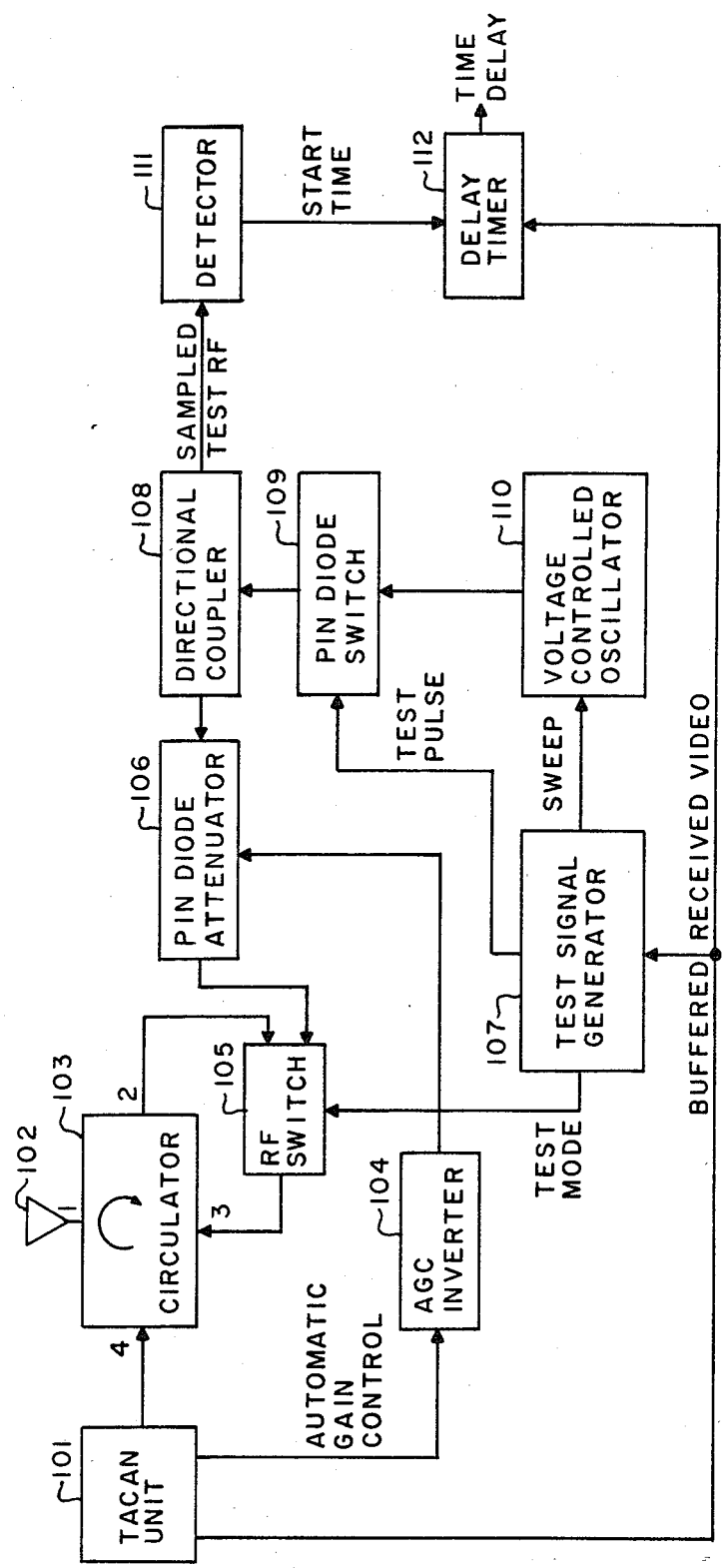
FIG. 1 is a block diagram of the present invention.

FIG. 1 is a block diagram of the basic system without automatic controls. The system of FIG. 2 comprises a TACAN unit 101, a TACAN antenna 102, a circulator 103, an AGC converter 104, an RF switch 105, a pin diode attenuator 106, a test signal generator 107, a directional coupler 108, a pin diode switch 109, a voltage control oscillator (VCO) 110 (referred to as either a VCO or VFO, Variable Frequency Oscillator), a detector 111, and a delay timer 112.

The TACAN unit 101 receives an output signal from the circulator 103 and provides two output signals, one an automatic gain control signal supplied to the automatic gain control inverter 104, and the second, a buffered receiver video output supplied to the signal generator 107 and the delay timer 112. The test signal generator 107 provides three output signals. The first is a test mode signal supplied to the RF switch to change the switch's position, a test pulse signal which is supplied to pin diode switch 108, and a sweep control voltage which is supplied to the voltage control oscillator 110.

The voltage control oscillator has one output which is supplied through the pin diode switch 109 to the directional coupler 108. The directional coupler 108 has two outputs, one of which supplies the detector 111, while the other supplies the pin diode attenuator 106. The detector 111 has one output which supplies the delay timer. The AGC inverter has one output which supplies the pin diode attenuator 106. The circulator 103 has four ports. The first port is connected to the antenna 102, the second to a first input port of the RF switch 105, the third to the output of the RF switch 105 and the fourth to the input of the TACAN unit 101. The RF switch has a second input port which accepts the output from the pin diode attenuator 106.

In the operation of the circuit shown in FIG. 1, the first step is to determine the operating frequency of the TACAN unit 101. This is accomplished by supplying a swept RF signal to the input of the receiver and noting the frequency at which a buffered receiver video output is received. Specifically, this is accomplished by setting RF switch 105 to position 2, setting pin diode switch 109 to minimum attenuation, and initiating a sweep of the variable frequency oscillator (VFO) 110 from one end of the TACAN receiver band until the operating frequent $f_t$ is reached. The test signal generator supplies a sweep control pulse to the voltage control oscillator to cause the sweep to take place. When an output pulse is received it stops the test signal generator from sweeping at $f_t$ and holds the oscillator 110 at $f_t$.

To measure the pulse delay time through the receiver, the output of the voltage control oscillator is modulated by the pin diode switch to form a pulse. The pulse is fed through the directional coupler, pin diode attenuator, port 2 of the RF switch, the circulator and into the input port of the TACAN unit at port 4 of the circulator. The output of the TACAN unit is monitored at the delay timer. During the time that the test RF pulse signal is generated by modulating the output of the VFO, the VFO is maintained at the operating frequency of the receiver, $f_t$ by a control signal from the test signal generator. A portion of the test pulse is fed from the directional coupler through the detector to the delay timer where it serves as the start time mark. The difference between the start time mark and and the arrival of the corresponding buffered received video pulse determines the delay time through the TACAN unit.

Figure 3:
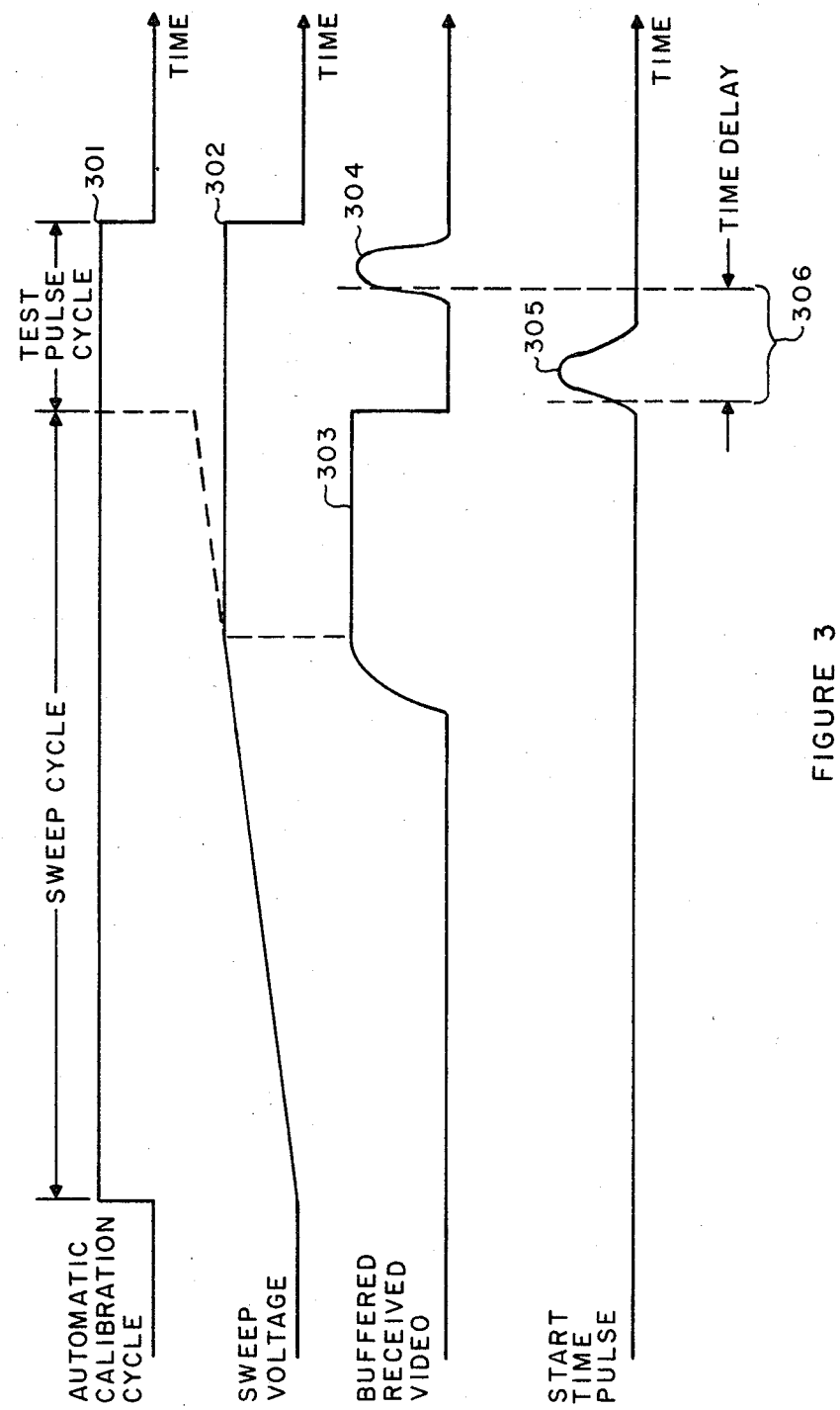
FIG. 3 is a diagram of wave forms associated with the systems shown in FIGS. 1 and 2.

The sequence of operation and the signals produced at various points in the circuitry are shown in FIG. 3. The uppermost graph 301 shows the time sequency between the sweep cycle and the test pulse cycle. The first portion of this graph shows the sweep cycle, during which the frequency of the VFO is swept to determine the frequency of operation, $f_t$ of the TACAN unit. The second portion of this graph shows the test pulse cycle, during which a test pulse is supplied to the receiver and the time delay of the corresponding emerging pulse from the receiver is measured. The following three graphs conform to the same time frame as the upper most graph and accordingly events which occur at the same time are located directly below one another.

The second graph 302 is a plot of the sweep voltage. It can be seen that the sweep voltage rises until $f_t$ is reached. Once this frequency has been reached, the sweep voltage is maintained constant until the end of the test pulse cycle, thus maintaining the frequency of the oscillator at $f_t$ during the test pulse cycle.

The third graph 303 shows the buffered receiver video output. The first portion of this graph shows no output until shortly before the oscillator has reached $f_t$. At this time, the output of the buffered received video produces an output which causes the oscillator to stop sweeping. Once the oscillator stops at $f_t$, and is maintained at this frequency, the buffered receiver video output remains constant, as shown by the graph. At the end of the sweep cycle, the buffered received video output drops again to zero until the test pulse is transmitted through the receiver during the test pulse cycle.

The fourth graph 304 is a plot of the start time pulse voltage derived from the detector 111. The first portion of this graph shows no output until a pulse is produced at the beginning of the test pulse period. Once the pulse has passed, this output drops to zero and remains at this level. The difference between the half power points of the start time pulse shown on graph 305 and that of the buffered received video pulse output determines the delay time through the TACAN unit. This time is shown beneath graph 305 and is designated by drawing numeral 306.

It can be seen from FIG. 1 that the delay timer receives both the received video output pulse and the start time pulse (from the detector III), enabling it to measure the delay time 306 shown in FIG. 3.

Figure 2:
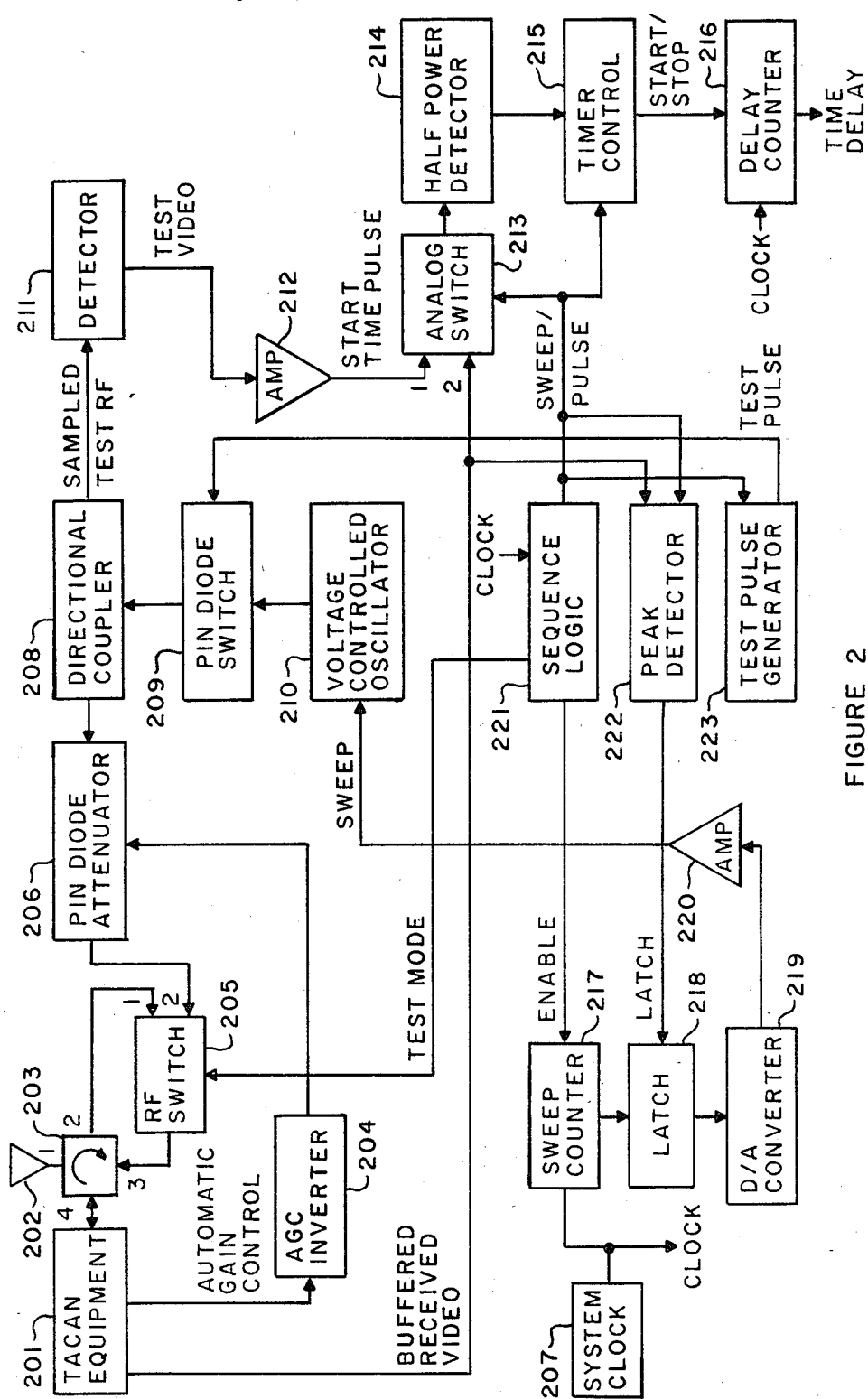
FIG. 2 is a detailed block diagram of the present invention showing the RF and control circuitry.

FIG. 2 adds the control circuitry necessary to operate the components shown in FIG. 1. FIG. 2 also shows some of the detailed circuitry of of the components of FIG. 1. The components in FIG. 2 that are similar to those shown in FIG. 1 are designated with identical last digits. However, the first digit of all components in FIG. 2 is the numeral 2. The additional components shown in FIG. 2 include a system clock 207, a sweep counter 217, a latch 218, a digital to analog converter 219, an amplifier 220, a sequence logic unit 221, a peak detector 222, a test pulse generator 223, and a delay counter 216.

In FIG. 2, the system clock supplies an output to the sweep counter, the sequence logic unit, and the delay counter. The sequence logic unit receives the clock signal and provides an output to the RF switch (test mode control signal), an output to the sweep control counter (enable control signal), and an output to the analog switch and the timer control (sweep/pulse control signal). This latter signal is also supplied to the peak detector. The peak detector accepts a signal from the buffered receiver video as well and supplies one output to the latch 218. The sweep counter supplies a signal which is passed through the latch (when it is not latched to hold the output of the counter at one point) to the D/A converter 219, the amplifier 220, to the voltage control oscillator.

The test pulse generator receives a signal from the sequence logic unit and produces a test pulse signal that is supplied to the pin diode switch 209.

Analog switch 213 receives three inputs. The first is the start time pulse signal from the detector 211 which is transmitted by way of amplifier 212. The second is the buffered receiver video signal from the TACAN unit. The third is the sweep/pulse signal from the timer control unit 215. The output of analog switch 213 is supplied to the half power detector 214. The output of the half power detector is supplied to the timer control 215 which in turn supplies its output signal (start/stop control signal) to the delay counter. The output of the delay counter is the desired end result which represents the time delay measurement between the receiver input and output pulse.

In the operation of this system, the automatic calibration cycle is primarily controlled by sequence logic unit 221. At the start of this cycle, RF switch 205 is changed from position 1 to position 2 and pin diode switch 209 is set for minimum attenuation. This action permits the TACAN equipment to receive only test signals because the connection of the receiver input to the antenna is broken by the switch 205 and reconnected to receive the swept RF signal and subsequently the test pulse. Next, sweep counter 217 is enabled by the "enable" signal from the sequence logic unit 221. The output of the sweep counter is sent to latch 218. At this time, latch 218 is in a transparent mode of operation and thus the sweep counter outputs are passed on directly to D/A converter 219. The D/A converter 219 output is sent to amplifier 220 to derive the sweep voltage 302. This action sweeps the voltage controlled oscillator 210 output frequency from one end of the TACAN operating band to the other, if not interrupted. During the sweep cycle, the peak detector 222 monitors the TACAN buffered received video output signal for a peak. When a video peak is detected by peak detector 222, the latch 218 is changed from its transparent mode to a hold mode, thereby "freezing" the voltage controlled oscillator 210 at its current frequency ($f_t$). At the end of the sweep cycle, pin diode switch 209 is set for maximum attenuation and the test pulse cycle is started.

During the test pulse cycle, the time delay measurement is performed. At the start of the test pulse cycle, analog switch 213 receives an enabling signal from the sequence logic unit which closes the connection between input port 1 of the switch and the output of the switch, thereby connecting the output of the detector 211 to the half power detector 214. This supplies the output of the detector, 211 which is a detected replica of the RF input pulse to the receiver, to the half power detector. At the same time, test pulse generator 223 receives an enabling control signal from the sequence logic unit, causing the pulse generator to generate a Gaussian shaped modulation signal which is transmitted to the pin diode switch 209. The modulated RF signal is sampled by directional coupler 208 and converted into the detected pulse replica by the detector 211 and transmitted to the half power detector by the path described above. At the same time, the modulated RF input pulse generated in the pin diode switch is also sent to the TACAN equipment by way of pin diode attenuator 206, RF switch 205 and circulator 203.

Amplification provided by amplifier 212 is necessary because of the relatively low amplitude of the detected pulse replica. Upon receipt of the detected pulse replica, the half power detector 214 determines the time of occurrence of the half power point which is transmitted to the timer control 215. The timer control start the delay counter 216 and provide a control signal which changes the state of analog switch 213 by opening the connection between input port 1 and the output and closing the connection between input port 2 and the output. Once the analog switch 213 has changed state, the TACAN buffered receiver video signal is monitored for its response. When this signal reaches its half power point, as determined by the half power detector, the delay counter 216 is stopped by way of a signal transmitted from the half power detector 214 through the timer control 215. The result is the delay counter 216 provides a precise measurement of the delay through the receiver for the RF test pulse from which the range error due to receiver and cable delays may be determined.

The half power detector contains a delay line, permitting the detector to determine the peak value of a pulse upon its being applied to the half power detector and to subsequently use this value for comparison with the pulse as it emerges from the delay line to determine the half power point. Although the delay line adds a delay to the measurement time of the half power points, the added delay is constant and is removed in the subtraction occuring in delay counter 216.

AGC inverter 204 is used to control the pin diode attenuator 206 as an inverse function of the TACAN automatic gain control. This action is needed to maintain the test RF signals within the linear operating range of the TACAN equipment.

At the end of the test pulse cycle, RF switch 205 is returned to position 1 to permit TACAN operation.

This invention uses only a single test pulse to perform the time delay measurement, thereby insuring that the TACAN equipment cannot falsely "lock-on" to the test signals. TACAN normally functions with pulse pairs and will not recognize a single pulse as a TACAN signal received from a ground based TACAN station. Also the time required for automatic calibration cycle is relatively short making it possible for the testing to be performed during the TACAN equipment "quiet" periods. Quiet periods occur when the TACAN equipment is not engaged in transmitting, receiving or processing normal TACAN signals.

Although a specific embodiment has been shown and described for illustrative purposes, the invention is not limited thereby. There are a number of alternative equivalent systems which fall within the spirit and scope of the invention.

One alternative approach is to take advantage of the fact that the TACAN equipment transmits signals that are always 63 MHz away from the receiving frequency. These transmissions are sampled, delayed and shifted in frequency to produce a TACAN test pulse. Because of the way the TACAN equipment is designed, the RF delay required is at least 50 microseconds. However, producing this amount of RF delay at the TACAN operating frequencies, is not considered as cost effective as the specific embodiment described above.

Having described our invention, we claim:

1. Apparatus for measuring the pulse transmission time delay through a receiver having an RF input port and a video output port accessible to said apparatus and wherein the operating frequency range of the receiver is known, but the exact frequency within this operating frequency range to which the receiver is tuned ($f_t$) is not known, comprising:
    (a) a variable frequency oscillator (VFO) having an operating frequency range which encompasses that of the receiver,
    (b) sweeping means for generating and supplying a signal to the VFO to sweep the VFO through the operating frequency range of the receiver,
    (c) means for coupling the output of the VFO to the RF input port of the receiver,
    (d) sweep stop means for generating and supplying a sweep stop signal to the sweeping means to stop the sweep of the VFO at $f_t$ in response to the receiver video output which occurs when the VFO has reached $f_t$ during the sweep, said sweep stop means being connected to the receiver video output port to receive the video output signal from the receiver and also being connected to the sweeping means to supply the sweep stop signal to said sweeping means, (e) pulse modulation means for modulating the output of the VFO to produce an RF pulse at the frequency $f_t$, said pulse modulation means being connected in series between the output of the VFO and the RF input port of the receiver, (f) pulse modulation control means for generating and supplying signals to the pulse modulation means to pass the VFO output without modulation during the sweep of the VFO and for pulse modulating the output of the VFO after the VFO has reached $f_t$ to produce a single pulse at the frequency $f_t$, said pulse modulation control means being connected to the video output port of the receiver to receive the output signal when the VFO has reached $f_t$, and (g) pulse delay measurement means for measuring the time between the occurrence of like points on an input pulse entering the RF port of the receiver and an output pulse from the video output port of the receiver, said pulse delay measurement means being connected to the output of the pulse modulation means to receive a sample of the RF input pulse supplied to RF input port of the receiver and also connected to the video output port of the receiver to receive the output video pulse produced by said input RF pulse and said pulse delay measurement means supplying an output which is the measurement of the time delay between said input and output pulses.

2. Apparatus as claimed in claim 1, further comprising repetitive cycle means for reinitiating and continuing the VFO sweep and pulse delay measurement steps repetitively, said repetitive cycle means including a clock and a counter, the clock supplying the counter a series of equal interval clock pulses and the counter supplying output pulses to the sweeping means at uniform intervals sufficiently long to permit a complete sweep and pulse delay cycle regardless of the $f_t$ to which the VFO is swept, the output of the counter being supplied to the the sweeping control means to reinitiate the sweep and pulse measurement cycle.

3. Apparatus as claimed in claim 1, wherein said pulse delay measurement means includes a pulse half power point detector for determining the like points at the half power points of the receiver input and output pulses.

4. Apparatus as claimed in claim 2, further comprising a circulator and an RF switch, the RF switch having an input port and two output ports, the circulator having four ports, the first being designated the input port the second and third-intermediate ports and the forth the output port, the circulator be of the type in which a signal received at the input port of the circulator can be coupled out at the second port and returned at the third port to be transmitted out the fourth port, said first port of the circulator being connected to the antenna of the receiver, while the fourth port is connected to the RF input of the receiver, the third port of the circulator is connected to the input port of the RF switch while the second port of the circulator is connected to one output port of the RF switch, the remaining output port of RF the switch being connected to the output of the pulse modulation means to enable the switch to be actuated for pulse delay measurement and for normal receiver operation.

* * * * *